April 24, 1951  L. H. BRAUN  2,550,526
APPARATUS FOR PROCESSING ICED BAKERY PRODUCTS
Filed Sept. 11, 1947  2 Sheets-Sheet 2
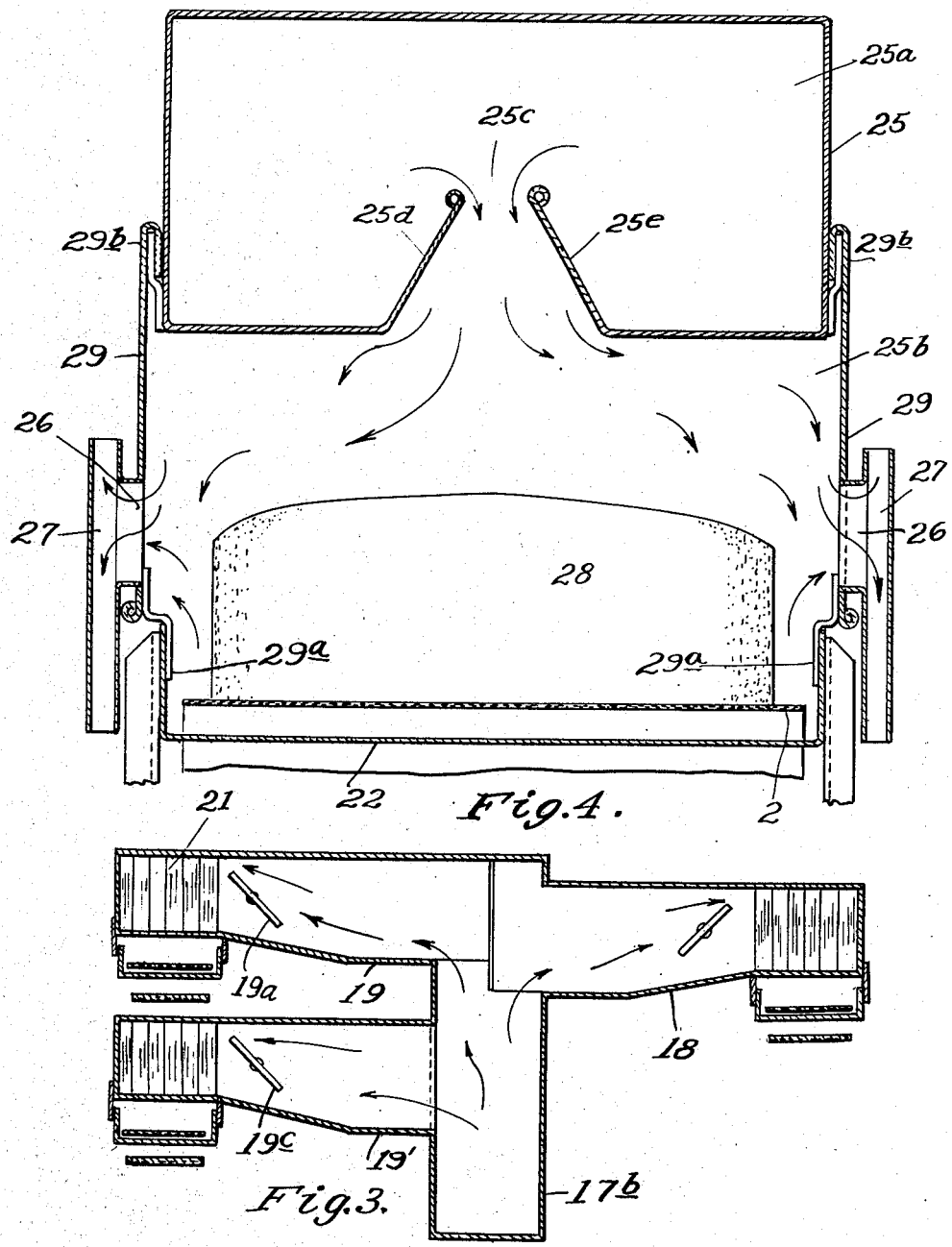
Inventor
*Louis H. Braun*
By *Christy, Parmelee & Strickland*
Attorneys Patented Apr. 24, 1951

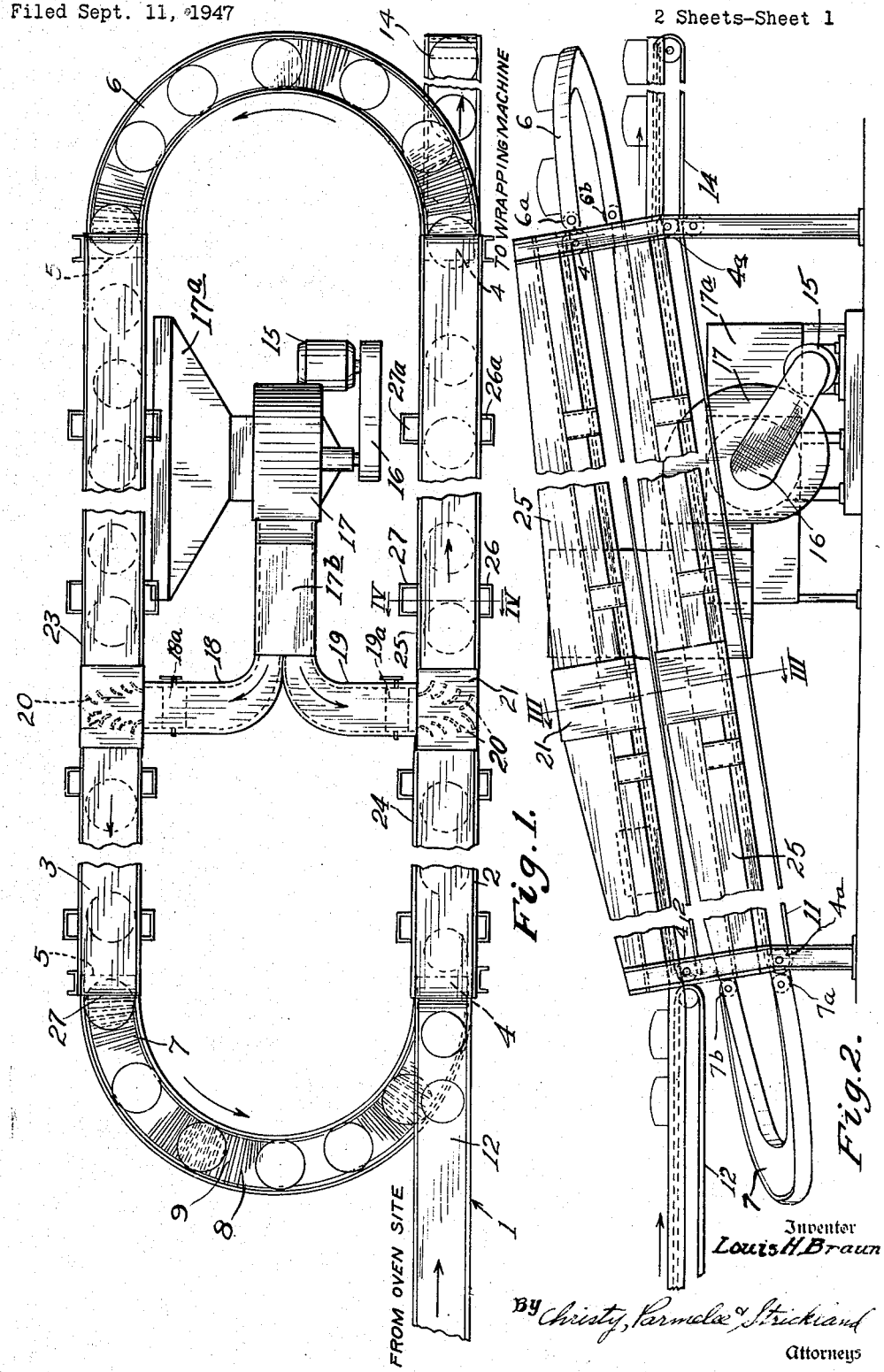

2,550,526

UNITED STATES PATENT OFFICE 2,550,526

APPARATUS FOR PROCESSING ICED BAKERY PRODUCTS

Louis H. Braun, Beaver, Pa., assignor to Keystone Bakery, Inc., West Bridgewater, Pa., a corporation of Pennsylvania Application September 11, 1947, Serial No. 773,463

3 Claims. (Cl. 34—233)

This invention is for an apparatus for use in bakeries and other food processing establishments for processing iced cakes and similar products and relates to apparatus for drying, setting or firming icing after it has been applied to the products.

A common practice in bakeries is to coat cakes and pastries with soft, plastic icings and then place them on trays which are loaded into carts, where they are allowed to remain for a considerable period of time until the icing sets and becomes firm. The cakes cannot be wrapped until the icing has set, and with this haphazard practice, large numbers of iced cakes accumulate before they are wrapped; some may be exposed to the air of the room for much longer periods of time than others, causing the product to dry out, and some may be prematurely wrapped.

An object of the present invention is to overcome the above-mentioned disadvantages by providing a novel apparatus and method for effectively setting the icings in a comparatively short length of time, each unit or piece of goods is uniformly cured or processed, storage space is reduced, the handling capacity of the plant is increased and manual labor is reduced.

According to the present invention, the cakes or other units, upon being iced, are moved at a uniform regular speed along an enclosed duct, while air, conditioned to optimum conditions of temperature and humidity, is diffused over and around the units, so that after a few minutes, they are uniformly processed and may be delivered directly to wrapping machines.

Other objects and advantages of the present invention will become apparent from the following specification taken with the accompanying drawings wherein:

Fig. 1 is a plan view of an apparatus embodying my novel invention and for practicing the method;

Fig. 2 is a side elevation of the structure shown in Fig. 1;

Fig. 3 is a cross-sectional view on a larger scale taken along line III—III of Fig. 2; and Fig. 4 is a cross-sectional view on a still larger scale taken along line IV—IV of Fig. 1.

Referring to the drawings, and especially Figs. 1 and 2, there is a conveyor system, which, for the purpose of conserving floor space in the bakery, is preferably arranged as shown, and is comprised of several separate conveyor units, each discharging onto a succeeding one, and which move the cakes in succession from an icing station (not shown) to a wrapping machine or station (not shown). Where floor space is not critical a single conveyor or other conveyor arrangement may be used. The conveyor system comprises a pair of inclined straight conveyors arranged in spaced parallel relationship and having belts 2 and 3 which are passed over rollers 4 and 5, respectively. Belts 2 and 3 are driven in opposite directions as indicated by the arrows.

A pair of semi-circular conveyors 6 and 7, preferably of the type having relatively movable links and rods, are provided at the ends of the straight conveyors. Conveyors 6 and 7 may be of a known type which comprises closely spaced straight rods, such as 8 and 9, which rods have link portions at both ends thereof which interengage corresponding link portions of adjacent bars. These link portions form chains along the inner as well as the outer diameters of the semicircular conveyors 6 and 7. Thus the link portions along the inner diameter overlap or come closer together than the link portions along the outer diameter because of the difference in radii of the inner circle and outer circle of conveyors 6 and 7. The conveyor 7 passes over rollers 7a and 7b which confront rollers 4a and 5, respectively. Rollers 7a and 7b have teeth corresponding to the spacing of the rods and engage them so as to drive the conveyors in the direction indicated by the arrow. Conveyor 6 is similarly constructed and has rollers 6a and 6b confronting rollers 4 and 5, respectively, which also drive the conveyor 6 in the direction indicated by the arrow. Conveyor 6 therefore transfers cakes from the belt 2 to the belt 3.

A third belt conveyor 11 is provided under the conveyor 2, and the semicircular conveyor delivers the cakes from the lower end of belt 3 to the bottom or receiving end of belt 11. Cakes which come from the icing station are carried on a horizontal conveyor 12 which terminates at the lower end of conveyor 2, and the freshly iced cakes are first transferred from belt 12 onto the upper conveyor belt 2 and moved longitudinally until they are transferred onto the conveyor 6, thence onto conveyor belt 3, and from there onto conveyor 7, and thereafter onto the lower conveyor 14 and are moved to the wrapping machine. Thus, the cakes are moved along a looped path by which a long travel over a small space is secured. Of course, various modifications may be made in the conveyor arrangement to adapt it to the floor plan of a particular bakery.

According to the present invention, conditioned air is effectively used to set the icing. To this end, the entire apparatus is housed in a workroom which is slightly pressurized and which is provided with air conditioning through which a temperature of the order of 65 to 82° F. may be maintained at an absolute humidity of around 35 to 55, the air being warm enough and dry enough to be comfortable to those working the room, but not so dry as to be injurious to the baked goods. The walls of room and air conditioning system are of conventional construction and are not illustrated in the drawing. The conditioned air may, however, be derived from any suitable source, which may be, for example, one separately provided for the operation of the unit, although I have found that air from the air conditioned workroom is entirely satisfactory.

The air is utilized by the use of a fan 17 driven by motor 15 and belt 16 which takes in air from one point in the room, say through an intake 17a, and discharges it into a duct 17b. Duct 17b discharges into three ducts, 18, 19 and 19', the air flowing in the direction of the arrows, duct 19' being directly under duct 19 (see Fig. 4). In each of these ducts 18, 19 and 19', there are preferably provided flow regulating dampers 18a and 19a and 19c, respectively, which may be of the butterfly type with quadrant fixing devices.

Each of the belt conveyors 2, 3 and 11 has a separate enclosure, including a bottom sheet 22 (see Fig. 4), with side flanges thereon, the bottom plate being below the conveying flight of the belt. A side plate 29 is removably secured to the flanges of the bottom plate by cleats 29a. Above the top of each conveyor belt there is a longitudinally extending wind-box 25, and the side plates 29 are hooked at 29b into cleats secured along the sides of the wind-box. The wind-boxes taper in height from a wind point toward both ends, and the duct 19 connects into the mid-point of the wind-box extending along the conveyor 11, while duct 18 connects to the mid-point of the wind-box over conveyor 3. Vanes or louvers 20 in connecting section 21 direct the air from the ducts 18, 19 and 19' out along the respective wind-boxes.

Each wind-box has an elongated opening in the bottom thereof, the opening being formed between upwardly converging flanges 25d and 25e in the bottom of the wind-box, the opening itself being designated 25c. This slot or opening is continuous, save for the short distance where the ducts 18, 19 or 19', as the case may be, connect into the wind-box.

Air is discharged from the wind-boxes downwardly toward the top of the conveyor and the cakes thereon. Some of this air may escape at the ends of the enclosure, but most of it is vented through ports 26 in the side plates 29 into small flue-like vents 27, this arrangement restricting the too free escape of the air. The tapering of the wind-boxes tends to equalize the flow of air through the slot 25c throughout its length. The inwardly turned flanges 25d and 25e defining the slot 25c causes the air to spread out so as to substantially envelop the whole top of the cake 28 without impinging locally on any one spot or line. It enables the opening 25d to be well above the tops of the cakes without making the whole arrangement too bulky.

At every point along its travel with one of the belt conveyors, the iced product is being flooded with a continuously moving body of air, and humidity which is substantially constant, whereas if air moved along the conveyor, either with the cakes or countercurrent, its humidity would increase as it traveled along. The present invention provides for any given air mass to be vented, on the average, after a short contact with the cakes.

The constant changing of the air contacting the icing with the controlled and average uniform humidity causes the icing to set and become firm in the time required for the cake to travel the entire length of the conveyor system, a period of but a few minutes. The icing will be uniformly firm, it will not be dried so that the icing is crusty, and the cake itself will not be dried out.

As stated previously, other shapes of conveyors may be employed instead, such as a long, straight conveyor or other shapes, so long as the cakes or other products are permitted to remain an appreciable length of time in the enclosure or duct while air is blown therethrough to effect setting of the icings. While the conveyors should be of a length such as to be moved continuously and take care of the full capacity of the icing table, it will be apparent that if longer exposure periods are desired, they may be slowed down considerably in speed or even stopped for periods of time while air is circulated through the ducts, and the rate of air circulation can be varied.

The apparatus is relatively simple and inexpensive, but tremendously increases the iced products capacity of the establishment, and reduces substantially the floor area required and the amount of handling and equipment for holding the cakes while the icing sets.

While I have illustrated and described certain specific embodiments of my invention, it will be understood that these are by way of illustration only, and that various changes and modifications may be made within the contemplation of my invention and within the scope of the following claims.

I claim:

1. In combination with a conveyor belt for moving articles from one station to another, a double-chambered duct, the lower chamber of which surrounds said conveyor and through which the articles are conveyed, means for circulating air under pressure through said upper chamber, a wall member forming said upper and lower chambers, a slot extending the length of the wall member, and upwardly converging wall members extending along the edges of the slot.

2. In combination with a conveyor for conveying freshly iced cakes or the like, a composite duct having an upper chamber portion and a lower chamber portion of substantially rectangular cross section, said lower chamber portion surrounding a portion of the conveyor, the bottom walls of said upper chamber portion having converging flange members extending upwardly from a central portion thereof throughout the length thereof and forming at the top thereof an opening for providing intercommunication between the upper and lower chamber portions, means for circulating air under pressure through said upper chamber portion, said air emerging from said upper chamber portion into said lower chamber portion through said opening at reduced pressure and onto the top portions of said cakes or the like to effect setting of the icing, and spaced outlet means connected to the lower chamber portion for removing moisture-laden air from said lower chamber portion.

3. In combination with a conveyor for conveying freshly iced cakes or the like, a composite duct having an upper chamber portion and a lower chamber portion of substantially rectangular cross section, said lower chamber portion surrounding a portion of the conveyor, the bottom walls of said upper chamber portion having converging flange members extending upwardly from a central portion thereof throughout the length thereof and forming at the top thereof an opening for providing intercommunication between the upper and lower chamber portions, means for circulating air under pressure through said upper chamber portion, said air emerging from said upper chamber portion into said lower chamber portion through said opening at reduced pressure and onto the top portions of said cakes or the like to effect setting of the icing thereof, and longitudinally spaced outlet means connected to the lower chamber portion for removing moisture-laden air from said lower chamber portion having a plurality of longitudinally spaced removable panels for providing access to the interior thereof.

LOUIS H. BRAUN.

REFERENCES CITED

The following references are of record in the file of this patent:

UNITED STATES PATENTS

| Number | Name | Date |
|---|---|---|
| Re. 16,699 | Cano | Aug. 9, 1927 |
| 1,509,591 | Davis | Sept. 23, 1924 |
| 1,567,633 | Bausman | Dec. 29, 1925 |
| 1,978,829 | Wilkie | Oct. 30, 1934 |
| 1,980,558 | Tandel | Nov. 13, 1934 |
| 2,101,651 | Reece | Dec. 7, 1937 |
| 2,113,770 | Richardson | Apr. 12, 1938 |
| 2,157,131 | Hothersall et al. | May 9, 1939 |
| 2,275,588 | Greene | Mar. 10, 1942 |
| 2,281,184 | Dykstra et al. | Apr. 28, 1942 |
| 2,257,487 | Tenney | Sept. 30, 1947 |
| 2,460,150 | Schupp | Jan. 25, 1949 |